2,842,486

PROCESS OF MAKING A CATALYST

Christian J. Wernlund, Niagara Falls, and Paul F. Bente, Jr., Lewiston, N. Y., assignors to E. I. du Pont de Nemours & Company, Wilmington, Del., a corporation of Delaware No Drawing. Application February 21, 1947
Serial No. 730,208

3 Claims. (Cl. 204—48)

This invention relates to the production of a new and improved catalyst and, more particularly, it relates to the production of a cobalt catalyst.

It is an object of this invention to produce an improved solid catalyst structure comprising cobalt.

It is another object of this invention to produce a solid, highly porous catalyst structure comprising cobalt.

It is still another object of this invention to produce a solid, rough, nodular catalyst structure comprising cobalt.

It is yet another object of this invention to produce a solid catalyst structure comprising cobalt which is particularly suitable for use in the decomposition of hydrogen peroxide.

Other objects of this invention will appear hereinafter.

The objects of this invention may be accomplished, in general, by electrodepositing cobalt in the form of a rough, porous, adherent coating on a metallic supporting structure. Such a rough, porous, adherent coating may be formed on a metallic supporting structure, for example, a supporting structure of iron, steel, copper, brass, bronze, nickel, or the like, by electrodeposition from a solution of a cobaltous salt under careful control of the pH of the solution and the cathode current density.

In accordance with the preferred procedure for the production of the cobalt catalyst of this invention, a foraminous iron or steel structure, for example, a meshed screen or a perforated sheet of iron or steel is provided with a coating of cobalt by electrodeposition from a cobalt plating solution comprising an aqueous solution of cobaltous sulfate heptahydrate ($CoSO_4 \cdot 7H_2O$), ammonium sulfate and ammonium hydroxide.

The iron or steel supporting structure for the catalyst of this invention preferably consists of commonly-known iron or steel wire screen having a mesh size between $\frac{1}{32}$ inch and $\frac{1}{4}$ inch. Such iron or steel screen may be obtained as plain screen without a protective coating or as an unlacquered-galvanized or lacquered-galvanized screen. When the screen contains no protective coating or when it contains a lacquer coating it is preferably first cleaned with an alkaline cleaning solution, for example, an aqueous solution containing 8 to 16 ounces per gallon of caustic soda. The screen may be cleaned in such solution by immersing the same in the solution having a temperature of 90° C. to 100° C. for a period of ten minutes and then spray-rinsing the same with water. Other alkaline cleaning solutions commonly used in the arts for such purposes can be used as well.

The screen, whether or not it is previously cleaned in an alkaline bath, is preferably subjected to acid pickling, for example, in an aqueous solution of sulfuric acid containing 3% to 5% acid and having a temperature around 20° C. to 30° C. The screen may be immersed in the acid pickling bath for a period of three to five minutes or as much longer as necessary to remove the galvanizing (zinc) therefrom and produce a clean steel surface. Any other acid pickling bath which will produce a clean steel surface can, of course, be used.

The clean steel screen may next be subjected to the cobalt plating operation. Although not essential, it is usually desirable to first provide the screen with a light coating of copper, commonly referred to as a copper strike. This may be done conveniently, for example, by positioning the screen as the cathode together with a steel anode in a bath composed of 2 to 6 ounces per gallon of copper cyanide, 4 to 8 ounces per gallon of sodium cyanide (alternatively, 5.5 to 8.0 ounces per gallon of potassium cyanide), said bath having a temperature of 30° C. to 70° C. and using a current density of 15 to 45 amperes per square foot at an E. M. F. of 4 to 6 volts for a period of 3 to 6 minutes. Other known methods for producing a copper strike may be used.

The screen, with or without the copper strike, is then plated with cobalt. The cobalt plating operation may be carried out in a plating solution containing between 40 and 50 grams per liter cobaltous sulfate heptahydrate ($CoSO_4 \cdot 7H_2O$), 40 to 50 grams per liter ammonium sulfate, sufficient ammonium hydroxide to maintain the solution at a pH value of 7.3 to 7.6, and free ammonia between 0.8 and 1.2 grams per liter. The plating solution is preferably maintained at a temperature between 22° C. and 32° C. The plating operation is carried out with steel screen in the bath constituting the cathode, the bath also containing cobalt anodes. The current density at the cathodes should preferably be maintained between 40 and 50 amperes per square foot, and the anode current density should be between 10 and 30 amperes per square foot. The plating is preferably carried out for a period of two to five hours, although shorter or longer periods of plating can be employed. By plating from a solution containing 45 grams per liter cobaltous sulfate heptahydrate ($CoSO_4 \cdot 7H_2O$), 45 grams per liter ammonium sulfate, and sufficient ammonium hydroxide to maintain a pH of 7.5, with a cathode current density of 45 amperes per square foot and an anode current density of 25 amperes per square foot at a voltage of about 4.0 volts, the weight of cobalt plated in approximately three hours will amount to about 160 grams per square foot of screen; an average plating thickness of about 0.007 inch. The coating will be rough and porous and fern-like in structure and will operate very satisfactorily as a catalyst for the decomposition of hydrogen peroxide. The cobalt-plated structure may be given an enhanced activity by dipping the same in hydrogen peroxide and allowing the same to dry in the atmosphere whereby an oxide coating is formed on the outer surface thereof.

The cobalt anodes may consist of cast structures formed from cobalt commercially available. The following two analyses of commercial cobalt show the approximate content of other substances:

|  | No. 1 | No. 2 |
|---|---|---|
|  | Percent | Percent |
| Cobalt | 98.45 | 98.71 |
| Nickel | 0.30 | 0.32 |
| Iron | 0.41 | 0.16 |
| Copper | 0.12 | 0.03 |
| Manganese | 0.013 | 0.04 |
| Sulfur | 0.003 | 0.004 |
| Calcium Oxide | 0.13 | 0.14 |
| Magnesium Oxide | 0.11 | 0.19 |
| Silicon Dioxide | 0.22 | 0.24 |
| Carbon | 0.19 | 0.20 |
|  | 99.95 | 99.93 |

Although it is not essential, it is preferred to rinse the screen structure between all cleaning and plating operations with water to avoid contaminating succeeding baths. Obviously, if the metal supporting structure is clean, the alkaline and acid cleaning and pickling treatments can be eliminated.

The cobalt catalyst structures produced in accordance with the present invention have a long life, are not easily poisoned or corroded and are particularly useful as decomposition catalysts for hydrogen peroxide solutions containing between 27% and 100% $H_2O_2$ by weight. These catalysts may, however, be used wherever cobalt has a useful function as a catalyst. When use is made of the catalytic structure of the present invention for the decomposition of hydrogen peroxide, it is only necessary to immerse the same in the aqueous peroxide solution.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. The process of producing a catalytic article particularly suitable for the decomposition of hydrogen peroxide the essential steps of which consist in constituting an iron supporting structure as the cathode and a cobalt structure as the anode in a plating bath consisting essentially of an aqueous solution containing 40 to 50 grams per liter $CoSO_4 \cdot 7H_2O$, 40 to 50 grams per liter $(NH_4)_2SO_4$, and sufficient ammonium hydroxide to maintain the solution at a pH of between 7.3 and 7.6, and passing an electric current through said bath with a cathode current density between 40 and 50 amperes per square foot and an anode current density between 10 and 30 amperes per square foot.

2. The process of producing a catalytic article particularly suitable for the decomposition of hydrogen peroxide the essential steps of which consist in constituting an iron supporting structure as the cathode and a cobalt structure as the anode in a plating bath consisting essentially of an aqueous solution containing 40 to 50 grams per liter $CoSO_4 \cdot 7H_2O$, 40 to 50 grams per liter $(NH_4)_2SO_4$, and sufficient ammonium hydroxide to maintain the solution at a pH of between 7.3 and 7.6, and passing an electric current through said bath for a period of two hours to five hours with a cathode current density between 40 and 50 amperes per square foot and an anode current density between 10 and 30 amperes per square foot.

3. The process of producing a catalytic article particularly suitable for the decomposition of hydrogen peroxide the essential steps of which consist in constituting an iron supporting structure as the cathode and a cobalt structure as the anode in a plating bath having a temperature between 22° C. and 32° C. and consisting essentially of an aqueous solution containing 40 to 50 grams per liter $CoSO_4 \cdot 7H_2O$, 40 to 50 grams per liter $(NH_4)_2SO_4$, and sufficient ammonium hydroxide to maintain the solution at a pH of between 7.3 and 7.6, and passing an electric current through said bath with a cathode current density between 40 and 50 amperes per square foot and an anode current density between 10 and 30 amperes per square foot.

References Cited in the file of this patent

UNITED STATES PATENTS

| Number | Name | Date |
|---|---|---|
| 172,862 | Adams | Jan. 17, 1876 |
| 1,043,580 | Eldred | Nov. 5, 1912 |
| 2,042,451 | Bond et al. | June 2, 1936 |
| 2,240,805 | Semon | May 6, 1941 |
| 2,315,518 | Gwynn | Apr. 6, 1943 |
| 2,393,516 | Burns | Jan. 22, 1946 |

OTHER REFERENCES

Fink: "Cobalt as a Catalyst," Transactions of American Electrochemical Society, volume 71, pages 487, 492 (1937).